J. M. CASON.
THRESHER.
APPLICATION FILED JAN. 18, 1917.
1,252,398.
Patented Jan. 8, 1918.
2 SHEETS—SHEET 1.
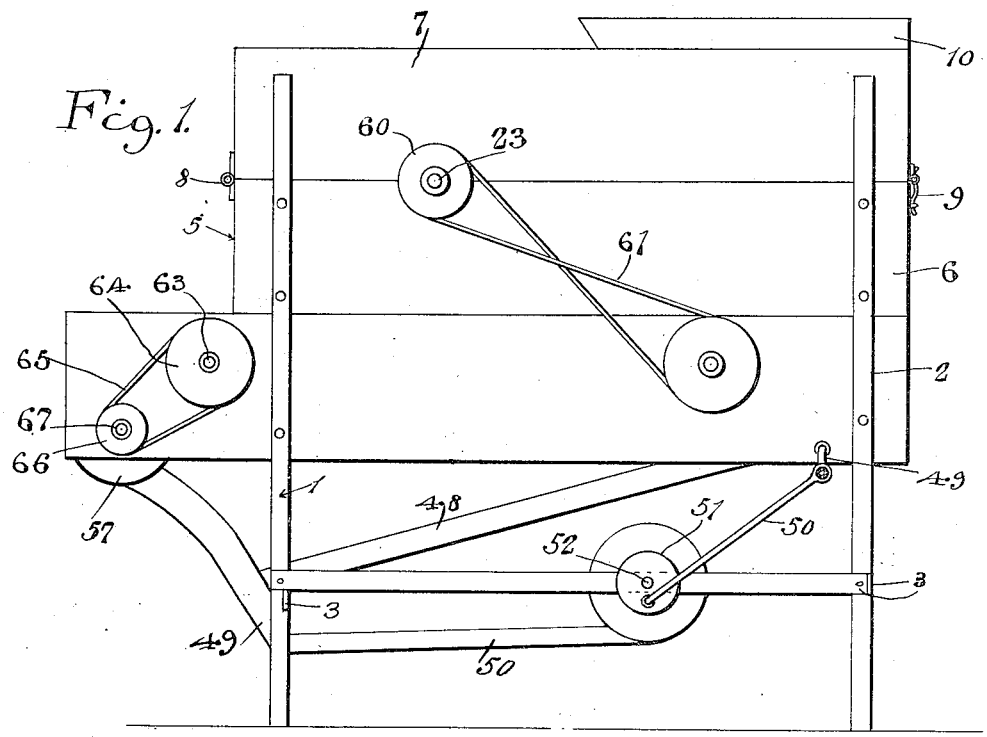
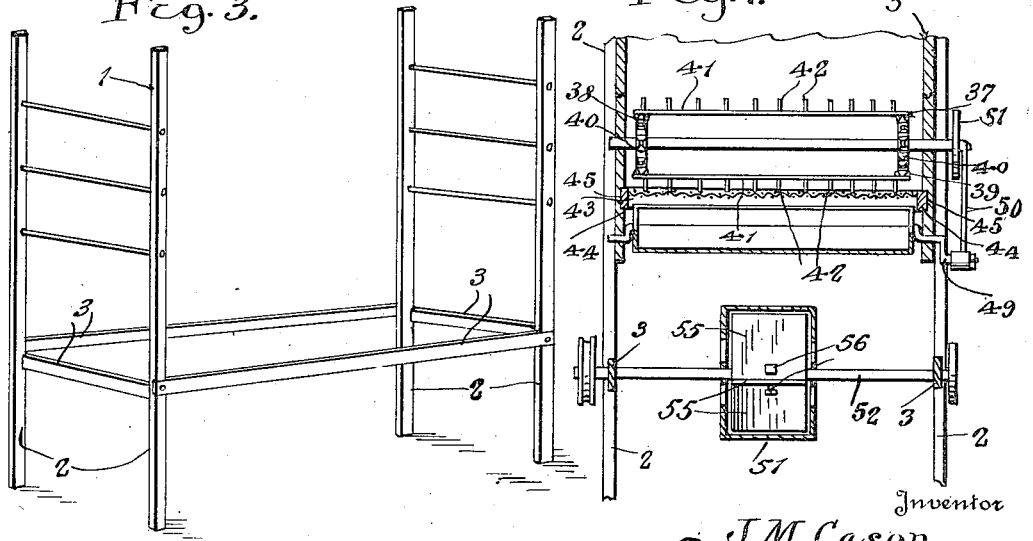
Witness
J. P. Nahler.
Rob't Meyer.
Inventor
J. M. Cason.
By _____ Randolph Jr.
Attorney

J. M. CASON.
THRESHER.
APPLICATION FILED JAN. 18, 1917.

1,252,398.

Patented Jan. 8, 1918.
2 SHEETS—SHEET 2.

Witness:
J. P. Waller
[signature]

Inventor
J. M. Cason.
By [signature]
Attorney

UNITED STATES PATENT OFFICE.

JAMES M. CASON, OF PIEDMONT, SOUTH CAROLINA.

THRESHER.

1,252,398.  Specification of Letters Patent.  Patented Jan. 8, 1918.

Application filed January 18, 1917. Serial No. 143,059.

*To all whom it may concern:*

Be it known that I, JAMES M. CASON, a citizen of the United States, residing at Piedmont, in the county of Greenville and State of South Carolina, have invented certain new and useful Improvements in Threshers; and I do hereby declare the following to be a full, clear, and exact description of the invention, such as will enable others skilled in the art to which it appertains to make and use the same.

This invention relates to a thresher for threshing peas, beans, oats, cane seed or analogous grain, and the primary object of the invention is to provide a thresher of this nature, which is comparatively simple in construction, durable and efficient in its operation.

Another object of the invention is to provide a thresher as specified, wherein a rotor having a plurality of radially extending fingers is employed for throwing the hulls and waste material out of the thresher, eliminating the usual feature of blowing the hulls and refuse from the thresher by an air circulation created by a fan.

Another object of this invention is to provide a thresher, which includes a threshing drum having a plurality of threshing fingers which pass between stationary threshing fingers for beating the grain from the pods or hulls, after which the broken parts of hulls and the threshed grain is engaged by a raking conveyer, which rakes the same over a screen, permitting the grain to fall downwardly upon a vibratory grain pan and from thence downwardly through an outlet chute, at which time it is submitted to a blast of air for cleaning the grain, and to provide a trough at one end of the screen for receiving the hulls and refuse from the machine, in which trough the foregoing mentioned rotor is mounted for throwing the pods, hulls and refuse from the trough and the thresher.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved thresher,

Fig. 3 is a perspective view of the supporting frame of the thresher,

Fig. 7 is a detail perspective view of a part of the raking conveyer.

Figure 2:
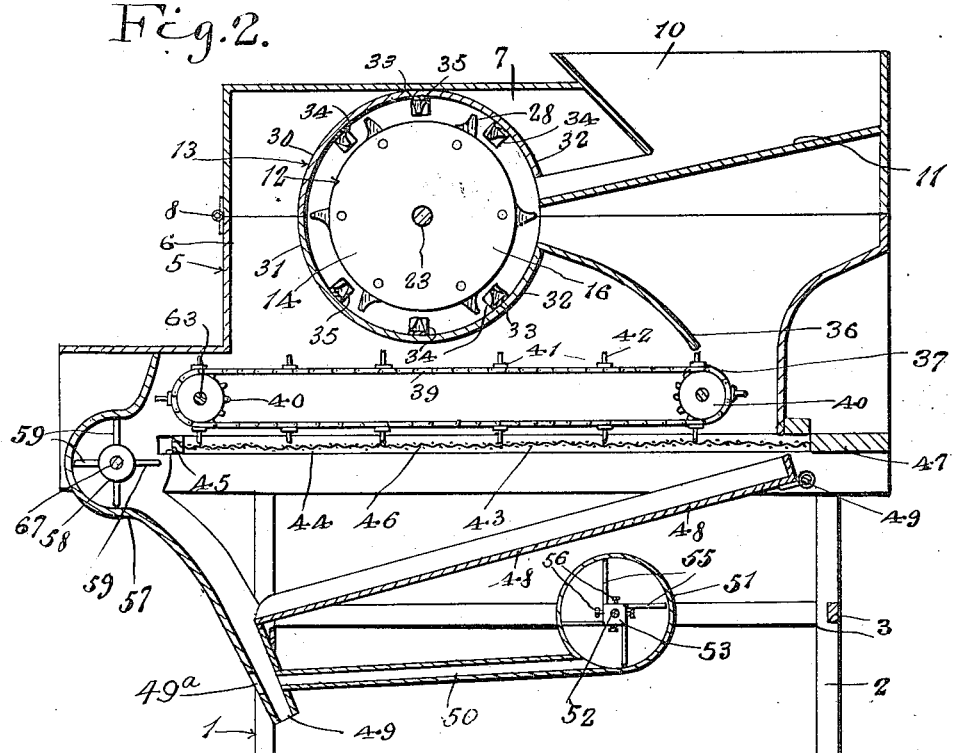
Fig. 2 is a longitudinal section through the thresher.
Figure 4:
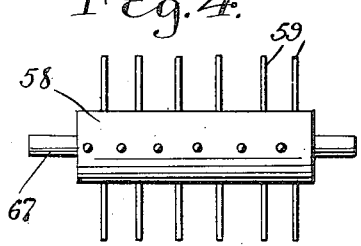
Fig. 4 is a detail view of the hull and refuse ejecting roller.
Figure 5:
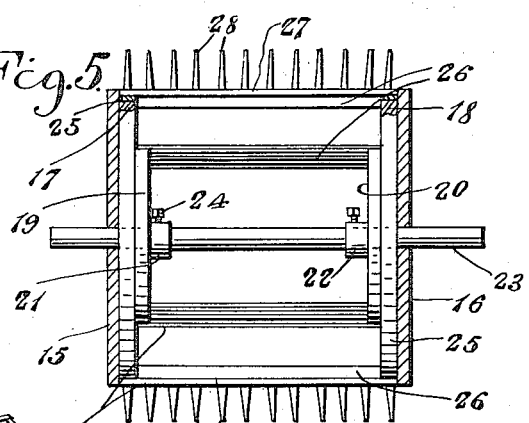
Fig. 5 is a detail view of the feeding or threshing drum.
Figure 6:
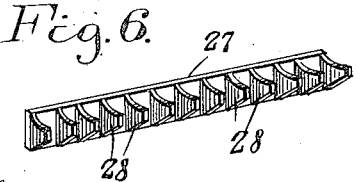
Fig. 6 is a perspective view of the spikes or fingers carried by the threshing drum.

Referring more particularly to the drawings, 1 designates the supporting frame of the thresher, which includes four vertical standards 2 that are braced by longitudinal and cross rails 3, for forming a frame adapted to receive and support the body of the thresher proper.

The body 5 of the thresher proper constitutes two sections 6 and 7. The section 7 is hingedly connected to the section 6, as is shown at 8, so that it may be upturned from the section 6 for permitting access to the internal parts of the thresher. Any suitable type of catch mechanism, illustrated at 9, may be employed for holding the section 7 in connection with the section 6.

The section 7 has a hopper 10 formed therein, and a pan or partition 11 extending downwardly from the hopper to the threshing or beating structure 12.

The threshing or beating structure 12 includes a stationary drum 13 and a rotary drum 14. The rotary drum 14 is positioned internally of the stationary drum or shell 13, and is composed of end disks 15 and 16, to the inner facing surfaces of which are attached disks 17 and 18. The disks 17 and 18 are smaller in diamter than the disks 15 and 16, and they have metallic disks 19 and 20 secured to their inner facing sides. Collars 21 and 22 are formed upon the disks 19 and 20 and receive the driving shaft 23 of the drum. The collar 22 and the disk 20 is shrunk upon the shaft 23, so as to prevent longitudinal movement of the collar independent of the movement of the shaft. The collar 21 has a set screw 24 carried thereby, which engages the shaft 23, and holds the collar 21, the disks 15, 17 and 19 rigidly in various adjusted positions along the length of the shaft 23. By adjustably mounting the disks 15, 17, 19 and the collar 21, the distance between the ends of the drum may be varied, as will be necessary in different constructions of the thresher.

The disks 17 and 18, which are less in diameter than the disks 15 and 16, have metallic reinforcing bands 25 mounted about their peripheries, to which bands bars 26 are attached at spaced intervals about the circumference about the disks. The bars 26 are preferably constructed of wood or metal and they have plates 27 secured to their outer surfaces, upon which plates a plurality of teeth 28 are formed. The teeth 28 have their edges, which engage the grain, rounded, so as to prevent the cutting or breaking of the grain during the beating of the same from the pods.

The stationary drum or cylinder 13 is constructed in two sections 30 and 31. The section 30 is carried by the section 7 of the thresher housing, and the section 31 is carried by the section 6 of the thresher housing. Each of the sections 30 and 31 are constructed of semi-rings 32, which have plates 33 secured thereto, at spaced intervals about the circumference of the rings. The plates 33 have angled irons 34 secured to their ends, which angled irons are attached to the sides of the sections 6 and 7 respectively, of the housing. The plates 33 have teeth 35 secured thereto at spaced intervals along their length, which teeth are similar in construction to the cylinder teeth carried by the bars 26 of the rotary cylinder or drum 14. The teeth 35 are disposed staggeredly with respect to the teeth 28, so as to permit of the free and unimpeded rotation of the cylinder or roller 14 interiorly of the drum 13.

A partition 36 extends outwardly and downwardly from the drum 13 and feeds the beaten grain on to a raking conveyer 37. The raking conveyer 37 is composed of sprocket chains 38 and 39, which travel over sprockets 40. The sprockets 40 are arranged in pairs. The chains 38 have flights 41 secured thereto at spaced intervals about their length, upon which flights teeth or prongs 42 are formed. The teeth or prongs 42 engage the beaten grain after it travels over the partition 36, and carries the same along over the upper surface of the screen 43, which is carried by the section 6 of the housing 5. The screen 43 is composed of a frame-work 44, which is provided for sliding in grooves 45 formed in the sides of the housing. A screen 46 is positioned interiorly of the frame 44 and the perforations of the screen may be of any size, as will be necessary for the threshing of various types of grain. A solid panel 47 is formed in one end of the screen 43.

The grain which will fall through the screen 46, falls upon a grain pan 48, which is mounted beneath the screen. The grain pan 48 has a crank shaft 49, connected thereto. The crank shaft 49 has a rod 50 connected to its outer end, which rod is in turn eccentrically connected to a disk 51, carried by the shaft 52. The rotation of the disk 51, will rock the shaft 49, and impart a vibratory movement to the pan 48, which will shake the grain downwardly over the upper surface of the pan. The grain, after traveling over the outer or lower outlet end of the grain pan 48, falls within a delivering chute 49, through which it travels for deposit in any suitable type of retainer.

The blast pipe 50 of a fan structure 51 communicates with the chute 49, so that upon rotation of the fan 52, a blast of air will be forced through the blast pipe 50 and through the delivery spout 49, for blowing dust or fine particles of hulls or pods free from the threshed grain. The spout 49 is provided with an opening 49ª formed therein directly opposite the opening of communication between the spout and the blast pipe 50. The opening 49ª allows a blast to pass through the spout and carry dust and fine particles of chaff with it for more thoroughly cleaning the grain.

The fan 52 is constructed of a substantially rectangular collar or block 53, which is adjustably and detachably mounted upon the shaft 54. A plurality of blades 55 are connected to the sides of the collar 53 by set screws or analogous devices, indicated at 56, by means of which the blades are interchangeable.

A trough 57 is carried by the frame 6 at the delivery end of the screen 46, and is positioned for receiving the pods and vines or other refuse, which is carried over the upper surface of the screen by the raking conveyer 37. A rotor 58 is positioned within the trough 57, and has a plurality of radiating fingers 59 carried thereby, which are provided for engaging and throwing the pods, vines or other refuse from the trough on the threshing machine, thereby eliminating the necessity of utilizing the blast of air from the fan for blowing the vines or pods from the thresher.

The shaft 23 extends beyond the edge of the housing of the threshing machine, and may be operatively connected to any suitable type of prime mover. A pulley is mounted upon the shaft 52, and is operatively connected to a pulley 60, which is carried by the shaft 23, by a twisted belt 61. The twisted belt 61 provides for the driving of the shaft 52, which drives the shaft 63, through the medium of the chains 38 and 39, and the sprockets 40 mounted upon the shafts 52 and 63. The shaft 63 has a pulley 64 mounted thereupon, about which a belt 65 travels. The belt 65 also travels about a pulley 66 mounted upon the shaft 67 upon which the rotor 58 is mounted. The pulley 66 is preferably of smaller diameter than the pulley 64, so as to rotate the shaft 67 and the rotor 58 at an increased rate of speed over the rotation of the shafts 52 and 63. The fan structure 52 may be either operatively connected to the shaft 23, or it may be connected directly to a prime mover, this feature being left to the desires of the person manufacturing the thresher.

From the foregoing description, it will be seen that a thresher has been provided which will run perfectly smooth and steady at all times, and which by changing the screens, any type of small grain, such as peas, beans, cane seed, kaffir corn or the like, will be efficiently threshed, and also that the operator of the threshing machine will not be subjected to the dust which might arise during the threshing of the grain. Furthermore that the rakes of the raking conveyer can not become clogged or misplaced within the interior of the harvester.

From the foregoing description taken in connection with the accompanying drawings the advantages of construction and of the method of operation of the improved thresher will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a thresher, the combination, of a stationary beating cylinder, a rotary beating cylinder, a screen positioned beneath said cylinders for receiving the grain after being beaten by said cylinders, a raking conveyer positioned for travel over said screen, a vibratory grain pan positioned beneath said screen for receiving the grain therefrom, a delivery chute positioned for receiving the grain at the outlet end of said vibratory grain pan, a fan, a blast pipe communicating with said fan and said delivery chute for guiding a blast of air transversely through the chute upon operation of the fan, a trough carried by said housing and positioned at the delivery end of said screen, and a rotor rotatably mounted within said trough for throwing pods, hulls and other refuse out of the trough and the thresher.

2. In a thresher of the class described, threshing means, a screen positioned beneath said threshing means, a raking conveyer, a guide board for guiding grain from said threshing means to one end of said conveyer, said conveyer carrying grain over said screen in a reverse direction to the direction of feed from the threshing means to the conveyer.

3. In a thresher of the class specified, threshing means, a screen positioned beneath said threshing means, a raking conveyer, a guide board for guiding grain from said threshing means to one end of said conveyer, said conveyer carrying the grain over said screen in a reverse direction to the direction of feed from the threshing means to the conveyer, a vibratory grain pan positioned beneath said screen for receiving grain therefrom, a delivery chute positioned for receiving the grain at the outlet end of said vibratory grain pan, a fan, an exhaust pipe communicating with said fan and said delivery chute for guiding a blast of air transversely through the chute upon operation of said fan.

In testimony whereof I affix my signature in presence of two witnesses.

JAMES M. CASON.

Witnesses:
M. H. MULLIKIN,
L. B. CASON.

Copies of this patent may be obtained for five cents each, by addressing the "Commissioner of Patents, Washington, D. C."